United States Patent [19]
Briery

[11] 3,747,814
[45] July 24, 1973

[54] SPARE TIRE CARRIER FOR AUTOMOBILE TRUNKS

[76] Inventor: Charles C. Briery, 947 Strait Ave., Topeka, Kans. 66616

[22] Filed: Aug. 24, 1971

[21] Appl. No.: 174,452

[52] U.S. Cl............................. 224/42.12, 296/37.2
[51] Int. Cl.............................................. B62d 43/00
[58] Field of Search...................... 224/42.12, 42.13, 224/42.14, 42.21, 42.23, 42.41, 42.45 R, 42.42 R, 42.46 R; 214/450, 451, 454; 296/37.2

[56] References Cited
UNITED STATES PATENTS
2,647,012   7/1953   Walker ........................ 224/42.23 X FOREIGN PATENTS OR APPLICATIONS
784,718   10/1957   Great Britain................... 224/42.23

Primary Examiner—Gerald M. Forlenza
Assistant Examiner—Jerold M. Forsberg
Attorney—Robert C. Brown, Jr., John M. Mann et al.

[57] ABSTRACT

A spare tire carrier for automobile trunks of the type having a shelf structure at the back of the trunk including a lower angle bracket having legs in right angle relation in which one of the legs is loosely received in upright relation over a mounting stud anchored at the base of the trunk shelf structure, with the other leg projecting outwardly of the trunk from the upper end of said one leg, a Z-bracket anchored to the roof of the trunk above the angle bracket and defining an arm projecting outwardly of the trunk and spaced below the trunk roof, and a J-bolt having its head end removably received in the angle bracket projecting leg and its threaded end extending through the Z-bracket projecting arm and carrying a wing nut to clamp the tire resting on the trunk shelf structure between the lower bracket and the trunk roof or torsion bar, depending on the make or model of the car.

6 Claims, 3 Drawing Figures

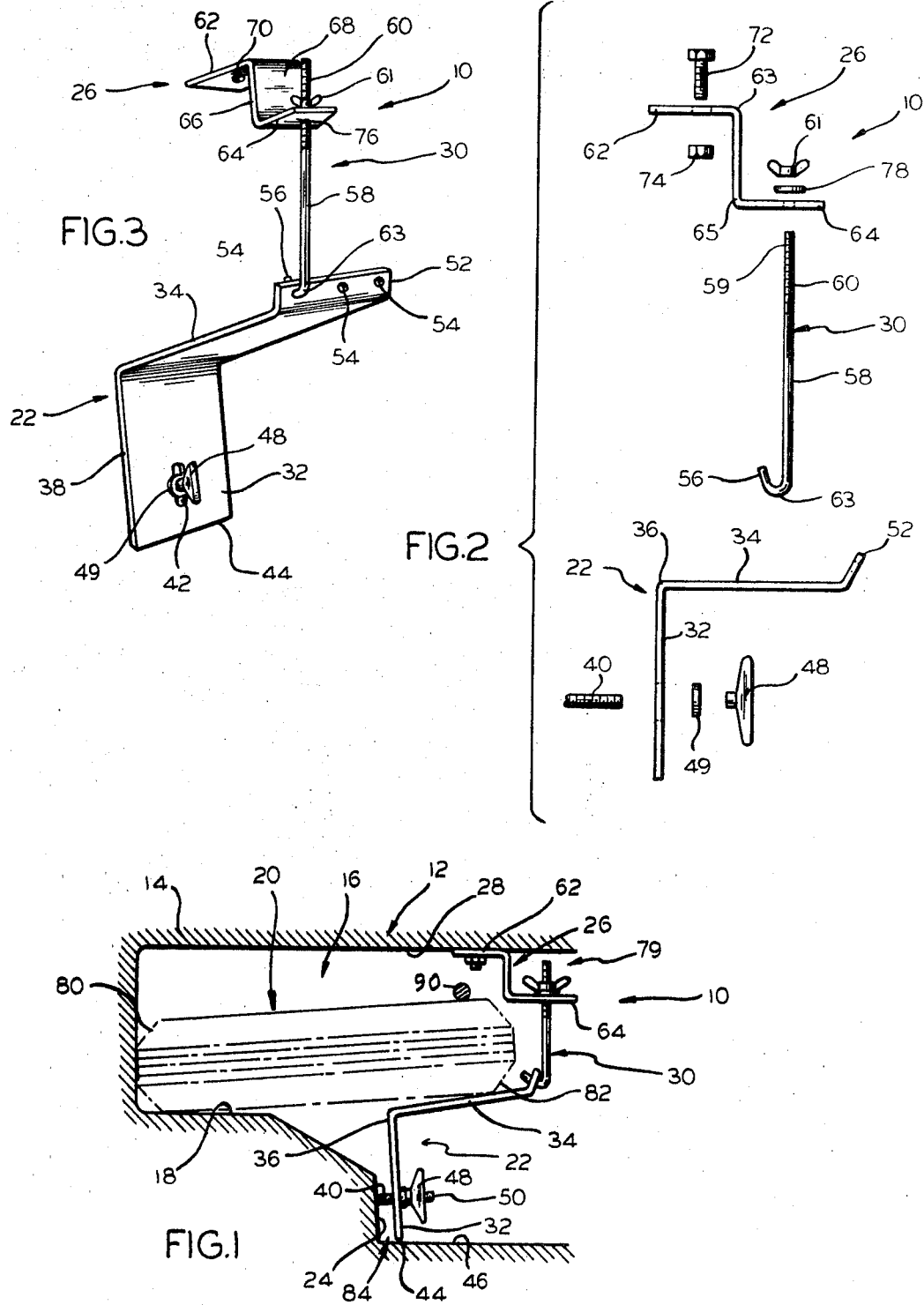

SPARE TIRE CARRIER FOR AUTOMOBILE TRUNKS

This invention relates to a spare tire carrier for automobiles, and more particularly to a spare tire carrier arranged for application to trunks of the sedan automobile type to securely hold spare tires in an out of the way position within the trunk.

The trunk of automobiles, particularly those of the sedan type, forms a convenient storage place for the car spare tire and tire changing tools. However, spare tire mounting arrangements are frequently such that is awkward and difficult to apply the spare tire to same and remove it when needed.

A principal object of this invention is to provide a spare tire carrier for trunks of the sedan type automobile that conveniently secures the spare tire in an out of the way position adjacent the roof of the trunk and also provides a way of storing the tire changing tools in a readily accessable position within the car trunk.

Other important objects of the invention are to provide a simple but effective way to mount a spare tire in a substantially horizontal position within and adjacent the trunk roof of sedan type autos, to provide a spare tire carrier that is of few and simple parts, and to provide a spare tire carrier that is economical of manufacture, convenient to install and use, and long lived in operation.

In accordance with this invention, a spare tire carrier is provided which is adapted specifically for use in connection with automobiles of the sedan type having a shelf structure at the rear of the auto trunk, in which the carrier comprises an angle bracket to be disposed adjacent the base of the shelf structure and having legs at right angled relation in which one of the legs is loosely received in upright relation over a mounting stud anchored at the base of the shelf structure, with the other leg projecting outwardly of the trunk from the upper end of the said one leg. Associated with the angle bracket is a Z-bracket anchored to the roof of the trunk above the angle bracket and defining an arm projecting outwardly of the trunk and spaced below the trunk roof. The two brackets are adapted to be connected by a J-bolt having its head end removably received in the angle bracket projecting leg and its threaded end extending through the Z-bracket projecting arm, which J-bolt is provided with a wing nut operating in the space between the Z-bracket projecting arm and the trunk roof to threadedly move the J-bolt so as to clamp the tire resting on the shelf structure between the lower brackets and the trunk roof or torsion bar (depending on the make or model of the car) for purposes of holding the tire firmly in place adjacent the trunk roof.

The upright leg of the angle bracket also provides a place to position tire changing tools, which are interposed between same and the base of the trunk shelf structure.

Still other objects, uses and advantages will be obvious or become apparent from a consideration of the following detailed description and the application drawings.

In the drawings:

FIG. 1 is a diagrammatic vertical sectional view through the trunk structure of a sedan type automobile showing one embodiment of this invention applied to the trunk to secure its spare tire in place;

FIG. 2 is a diagrammatic exploded perspective view of the spare tire carrier of this invention; and FIG. 3 is a perspective view of the parts shown in FIG. 2 in assembled relation.

However, it is to be understood that the specific drawing illustrations provided are supplied primarily to comply with the requirements of the Patent Code, and the invention has other embodiments that will be obvious to those skilled in the art, and that are intended to be covered by the appended claims.

Reference numeral 10 of FIGS. 1, 2 and 3 generally indicates one embodiment of my invention applied to the trunk 12 of an automobile 14. The trunk 12 is shown in diagram form only as it may have wide variations in general shaping and size, depending upon the make and model of the automobile involved, but is intended to represent trunks of the type generally found in sedan type automobiles.

The trunk 12 thus defines an inner trunk area 16 that is inwardly of the trunk door, which is not shown, but ordinarily is disposed to the right of the showing of FIG. 1, and swings upwardly of FIG. 1 to open the trunk. The automobile 14 is frequently formed to define within the inner trunk area 16 a shelf structure 18 on which some part of the spare tire 20 usually rests.

The car carrier 10 in accordance with this invention comprises an angle bracket 22 mounted in the trunk space 16 at the base 24 of shelf structure 18, a Z-bracket 26 fixed to the roof 28 of the trunk 12 above and to the rear or outwardly of the bracket 22, and a J-bolt 30 that operably connects the brackets 22 and 26 to clamp same against a tire 20 resting on the shelf structure 18.

The bracket 22 comprises a first leg 32 and a second leg 34, with said legs 32 and 34 being integrally united in substantial right angular relation at corner 36. As indicated in FIG. 3, these parts are preferably made from a one piece member 38 formed from suitable thickness or gauge of sheet steel or the like.

The leg 32 is received over threaded stud 40 which is suitably mounted or anchored in the shelf structure base 24 and is received through suitable elongated opening 42 formed in the bracket leg 32. Opening or perforation 42 is located relative to the end 44 of leg 32 such that the end 44 will rest on the floor 46 of the trunk when the bracket 22 is free of J-bolt 30. Perforation or openings 42 is also proportioned to be loosely received over the stud 40 so that bracket 22 may be readily adjusted along the length of stud 40.

Cooperating with stud 40 is wing nut 48 that is threaded on the projecting end 50 of the stud 40 against washer 49, as needed, to bias or move the leg 32 of the bracket 22 in the direction of the shelf structure base 24.

The leg 34 of bracket 22 in the mounted position of the bracket 22 projects outwardly of the trunk and has its end portion 52 angled upwardly and formed with suitable openings or perforations 54 to selectively receive the head end 56 of J-bolt 30 as best suited to accommodate the make and model of the car involved.

J-bolt 30 generally comprises in addition to an end 56, a shank 58 that is suitably threaded as at 60 for cooperation with suitable wing nut 61. In the form shown, the J-bolt shank 58 is angled as at 63 to provide the J-bolt configuration that is illustrated.

Bracket 26 generally comprises arms 62 and 64 that are in substantial parallel relation and project in opposite directions from a connecting body portion 66. Portions 62, 64 and 66 of bracket 26 are preferably integrally united at corners 63 and 65, respectively and may be defined by member 68 formed of a suitable gauge of metal sheeting that is bent to the Z configuration indicated.

The arm 62 of bracket 26 is formed with a suitable opening or perforation 70 which receives a suitable bolt 72 suitably anchored in the trunk roof that has cooperating with same suitable nut 74 for clamping the bracket 26 in its operating position. As already indicated, the bracket 26 is mounted above bracket 22, with its arm 64 projecting outwardly of the trunk. Obviously, the arm 62 could be secured to the trunk roof by other suitable securing means such as by employing rivets or welding, etc.

The arm 64 of bracket 26 is formed with suitable perforation or opening 76 through which the shank 58 of J-bolt 30 passes, with a suitable washer 78 being received between wing nut 61 and the bracket arm 64.

In employing a spare tire 20 to the carrier 10, the J-bolt 30 is removed from its connecting relation shown in FIGS. 1 and 3 and wing nut 48 backed off the end 50 of stud 40 so that the bracket 22 may be moved outwardly of the trunk, and off of stud 40, it being then rested on the trunk floor 46 (in this position, ends 44 and 52 will engage floor 46). This allows the spare tire to be freely inserted into the trunk area 16 so that the inwardly disposed portion 80 of same rests on the shelf structure 16. By lifting the inwardly disposed portion of the wheel upwardly so that the wheel is substantially horizontally disposed, bracket 22 may be inserted under wheel portion 82, reapplied to stud 40, and moved inwardly of the trunk back to a position approaching that of FIG. 1, after which the wheel portion 82 is rested on bracket 22. The bumper jack and wheel nut removal wrench then may be applied to space 84 between leg 32 of bracket 22 and shelf structure base 24, and washer 49 and wing nut 48 reapplied to stud 40.

The J-bolt shank 58 is then inserted in opening 76 of arm 64 of bracket 26, and its head end 56 inserted in a convenient opening 54 of the bracket 22 arm 34. The end portion 59 of the J-bolt shank will thus be projecting in the space 79 between the arm 64 of bracket 26 and the trunk roof, and when the washer 78 and wing nut 61 are applied thereto in that order, and the wing nut 61 turned relative to the J-bolt to thread same downwardly of the J-bolt shank, the bracket 22 will be lifted upwardly to bring the end 82 of the spare tire 20 against the trunk torsion bar 90 (conventionally part of the truck lid lifting mechanism) or the trunk roof 28, depending on the make or model of the car, to clamp the tire therebetween.

For this purpose, bracket 26 is mounted somewhat rearwardly of bracket 22 so that the tire will clear corner 65 of bracket 26 and bolt 72, in being clamped in place. Brackets 22 and 26 are preferably disposed substantially in the same vertical plane, however. Opening 42 is made sufficiently elongated to give the bracket 22 the freedom of vertical movement necessary, under the action of the J-bolt, to achieve the tire securement function indicated.

Wing nut 48 then may be tightened against the bracket leg 32, to appropriately tension the lower end of bracket 22, and clamp the bumper jack and wheel nut removal tool in secure riding position against the shelf structure base 24.

The tire thus will be securely held and supported at its rearward end 82 by being clamped between bracket 22 and the torsion rod 90 in the manner indicated in FIG. 1. Where the car has no such torsion rod 90, then the tire end 82 is drawn up against the car roof (the brackets 22 and 26 and bolt 30 may be appropriately proportioned for such applications).

When it is desired to remove the tire, it is merely necessary to remove wing nut 48 and washer 49 from stud 40 and then loosen wing nut 61 of J-bolt 30 sufficiently so that the J-bolt head 56 can be removed from opening 54 of bracket 22. The bracket 22 then may be readily moved outwardly and downwardly of the trunk permitting ready removal of the spare tire.

Bracket 26, if so desired, can be mounted at other suitable angles (for instance a right angle) to the position illustrated to accommodate special installation problems, though, of course, its arm 64 should be positioned to permit ready application of the J-bolt between same and bracket 22.

It will therefore be seen that this invention provides a spare tire carrier of few and simple parts, and yet which effectively secures the spare tire within the trunk in an out of the way position adjacent the roof of the trunk. Provision is also made to secure in place the familiar bumper jack and wheel bolt removing tools.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A spare tire carrier for automobiles for mounting a spare tire in the trunk of automobiles of the type having a shelf structure adjacent the rear of the trunk of the type defining a base facing outwardly of the trunk, said carrier comprising:
   a first bracket defining a projecting arm,
   a second bracket of generally right angular configuration comprising:
     first and second legs fixed together at their adjacent ends and in substantial perpendicular relation,
   means for securing said brackets to the trunk in substantially vertically spaced relation, with said arm of said first bracket substantially horizontally disposed, and one of the legs of said second bracket in substantial upright relation outwardly of but adjacent the shelf structure base and the other leg thereof extending outwardly of the trunk shelf and below said first bracket arm,
   said securing means including means for releasably anchoring said second bracket one leg to the shelf structure base for adjustment toward and away from the base,
   and bolt means for releasably connecting said arm of said first bracket and said other leg of said second bracket to secure in place a spare tire resting on the shelf structure and said second bracket other arm.

2. A spare tire carrier for automobiles for mounting a spare tire in the trunk of automobiles of the type having a shelf structure adjacent the rear of the trunk, said carrier comprising:
   a first bracket of Z-configuration defining:

a pair of substantially parallel arms spaced from each other and extending in opposite directions, and a body portion connecting adjacent ends of said arms, a second bracket of generally right angular configuration comprising:

first and second legs fixed together at their adjacent ends and in substantial perpendicular relation, means for securing said brackets to the trunk in vertically spaced relation, with said arms of said first bracket substantially horizontally disposed, and one of the legs of said second bracket in substantial upright relation and the other leg thereof extending outwardly of the trunk shelf and beneath the lower of said first bracket arms, and bolt means for releasably connecting said lower of said first bracket arms and said other leg of said second bracket to secure in place a spare tire resting on the shelf structure and said second bracket other arm.

3. A spare tire carrier for automobiles for mounting a spare tire in the trunk of automobiles of the type having a shelf structure adjacent the rear of the trunk, said carrier comprising:

a first bracket of Z-configuration defining:

a pair of substantially parallel arms spaced from each other and extending in opposite directions, and a body portion connecting adjacent ends of said arms, means for securing one of said arms to the roof of the trunk with the other arm extending outwardly of the trunk, whereby said body portion spaces said other arm below the trunk roof, a second bracket of generally right angular configuration comprising:

first and second legs fixed together at their adjacent ends and in substantial perpendicular relation, means for securing said second bracket to the trunk adjacent the base of the shelf structure and in vertically spaced relation beneath said first bracket, with one of the legs of said second bracket in substantial upright relation and the other leg thereof extending outwardly of the trunk shelf and in substantial horizontal alignment therewith, and bolt means for releasably connecting said other of said first bracket arms and said one leg of said second bracket to secure in place a spare tire resting on the shelf structure and said second bracket other arm.

4. The spare tire carrier set forth in claim 3 wherein:

said securing means for said second bracket comprises a threaded stud adapted to be anchored in the trunk, said second bracket one leg being loosely mounted on said stud, and screw means cooperating with said stud for drawing said second bracket one leg toward the base of the shelf structure to clamp tire changing tools therebetween.

5. The spare tire carrier set forth in claim 3 wherein:

said bolt means comprises a bolt having its head end removably received in said second bracket other leg and having its shank extending through said first bracket other arm, and a wing nut carried by said bolt shank for drawing said brackets together, and disposed in the space between said first bracket other arm and the trunk roof.

6. The spare tire carrier set forth in claim 5 wherein:

said bolt is of the J-bolt type, said second bracket other leg being upwardly angled at its outwardly extending end, said end of said second bracket other leg being perforated to receive the head end of said J-bolt.

* * * * *